(12) United States Patent
Peter

(10) Patent No.: US 6,860,356 B2
(45) Date of Patent: Mar. 1, 2005

(54) DRIVE FOR A MOTOR VEHICLE HOOD

(75) Inventor: Cornelius Peter, Bühl (DE)

(73) Assignee: TRW Automotive Electronics & Components GmbH & Co. KG, Radolfzell (DE)

( * ) Notice: Subject to any disclaimer, the term of this patent is extended or adjusted under 35 U.S.C. 154(b) by 55 days.

(21) Appl. No.: 10/150,295

(22) Filed: May 17, 2002

(65) Prior Publication Data

US 2003/0020284 A1 Jan. 30, 2003

(30) Foreign Application Priority Data

May 17, 2001 (DE) .................................... 201 08 338 U

(51) Int. Cl.$^7$ ............................................. B60R 21/34
(52) U.S. Cl. ................................. 180/274; 180/69.21
(58) Field of Search ............................ 180/274, 69.21; 49/141, 325, 340, 345; B60R 21/34

(56) References Cited

U.S. PATENT DOCUMENTS

| | | | | |
|---|---|---|---|---|
| 6,055,775 A | * | 5/2000 | Dering et al. ................. | 49/340 |
| 6,415,882 B1 | * | 7/2002 | Schuster et al. ......... | 180/69.21 |
| 6,439,330 B1 | * | 8/2002 | Paye ....................... | 180/69.21 |
| 6,571,901 B2 | * | 6/2003 | Lee ............................ | 180/274 |

FOREIGN PATENT DOCUMENTS

| | | |
|---|---|---|
| DE | 3800594 C1 | 7/1989 |
| DE | 3924295 C1 | 8/1990 |
| DE | 19642457 A1 | 10/1997 |
| DE | 19710417 | 9/1998 |
| EP | 1179458 | 2/2002 |
| JP | 11115680 | 4/1999 |
| JP | 11263191 | 9/1999 |

* cited by examiner

*Primary Examiner*—Eric Culbreth
(74) *Attorney, Agent, or Firm*—Tarolli, Sundheim, Covell & Tummino L.L.P.

(57) ABSTRACT

A drive for a hood on a motor vehicle, in particular an engine hood, which is movable between a closed position and a lifted position that is abruptly achieved in the case of an accident. The drive comprises a drive unit having an electric drive motor and being effective between a vehicle structure and the hood. The drive motor moves the hood into the lifted position in the case of an accident.

18 Claims, 15 Drawing Sheets

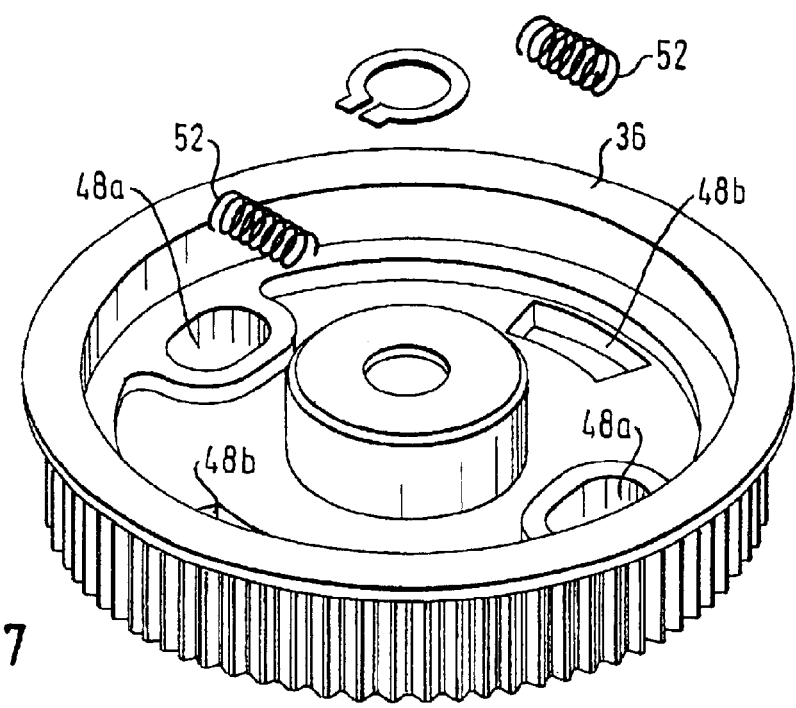
FIG. 7
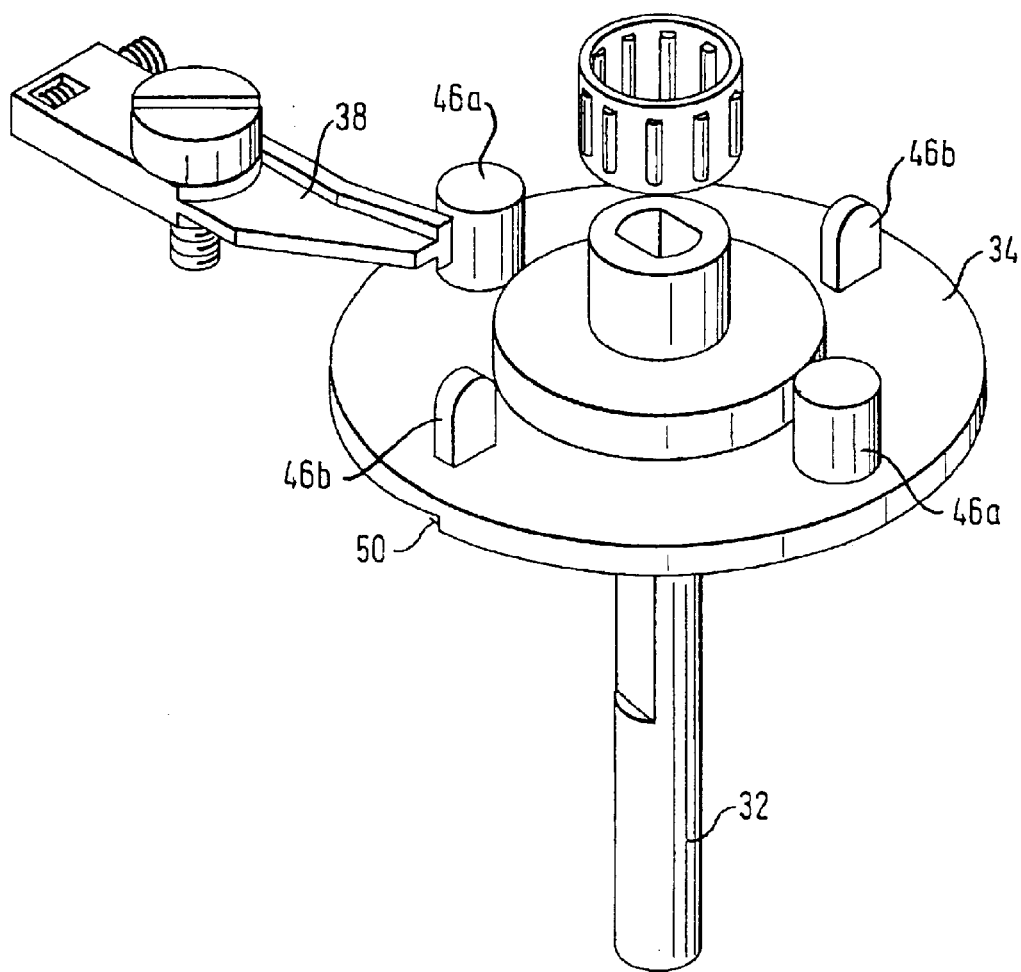

DRIVE FOR A MOTOR VEHICLE HOOD

TECHNICAL FIELD

The invention relates to a drive for a hood on a motor vehicle, in particular an engine hood.

BACKGROUND OF THE INVENTION

Such hoods are movable between a closed position and a lifted position, the drive comprising a drive unit active between a vehicle structure and the hood.

A pedestrian is able to be protected in a collision with a passenger car against injuries by lifting the engine hood, which enhances the deformation path thereof.

It is desirable that such lifting of the engine hood can be performed in case of an accident very rapidly and, if no collision occurs, repeatedly without the replacement of components, and further, that the engine hood can readily be transferred again into its closed position.

BRIEF SUMMARY OF THE INVENTION

The invention provides a drive for a hood on a motor vehicle, which allows in a simple manner a repeated, rapid lifting of the hood as well as a simple return into the closed position thereof. This is achieved in a drive which comprises a drive unit with an electric drive motor which is active between a vehicle structure and the hood. The drive motor moves the hood rapidly into a lifted position in case of an accident. Using the electric motor as energy source to lift the hood allows a lifting action without single-use parts like pyrotechnical units. Further, the movement of the hood can be predetermined very exactly and oscillations of the hood on reaching of the lifted position can be avoided.

Preferably, the energy for opening the hood is made available exclusively by the electrical motor. However, it is possible to provide an additional energy storing device that supports the electric motor during the initial movement of the hood. The drive motor preferably brings about in a dual function the releasing of the traveling stop, so that the hood can be lifted, as well as the lifting of the hood into the lifted position. Additionally, the motor can also return the hood from the lifted position into the closed position. If an energy storing device is provided, the latter movement is performed preferably in such a manner that the drive motor operates against the energy storing device.

The hood preferably concerns an engine hood, like in the example initially mentioned; the invention, however, is also transferable to other hoods in the vehicle such as trunk lids and so on.

BRIEF DESCRIPTION OF THE DRAWINGS

FIG. 7 is a schematic, exploded partial view of the drive unit used with the invention without showing the housing;

DETAILED DESCRIPTION OF THE PREFERRED EMBODIMENT

Figure 1:
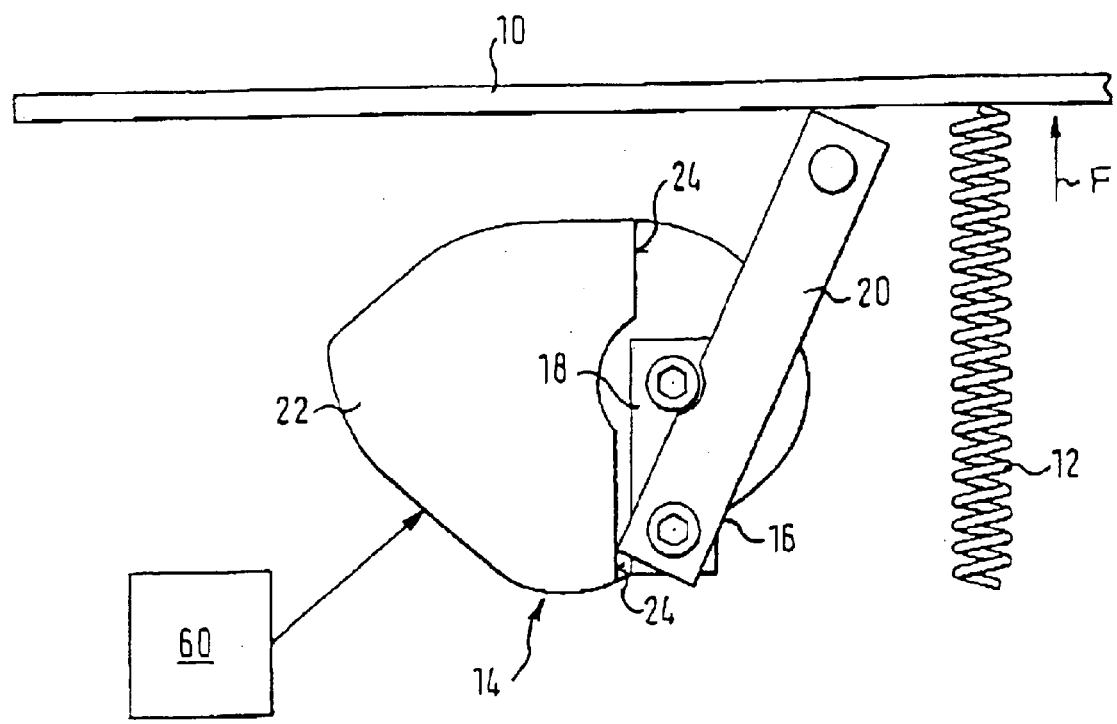
FIG. 1 is a schematic view of a vehicle hood including an energy storing device and a drive according to the invention, in a closed position of the hood.

A hood 10 of a motor vehicle, an engine hood in the example described here, is engaged by a drive unit 14 designed as a closed assembly unit. The drive unit 14 has a crank mechanism 16 with a first arm 18 and a second arm 20, the free end of second arm 20 being connected with the underside of the hood 10. In the closed position, the end of the first arm connected with the second arm is oriented so as to point away from the hood.

Optionally, the hood is connected with an energy storing device 12 separate from the drive unit 14, which is realized here in the form of a compression spring (helical spring) and which in the closed position of the engine hood (FIG. 1) exerts a force F onto the hood 10 at a place remote from the drive unit 14. The energy storing device 12 has its maximum energy, i.e. the spring is under tension, in the closed position.

Figure 2:
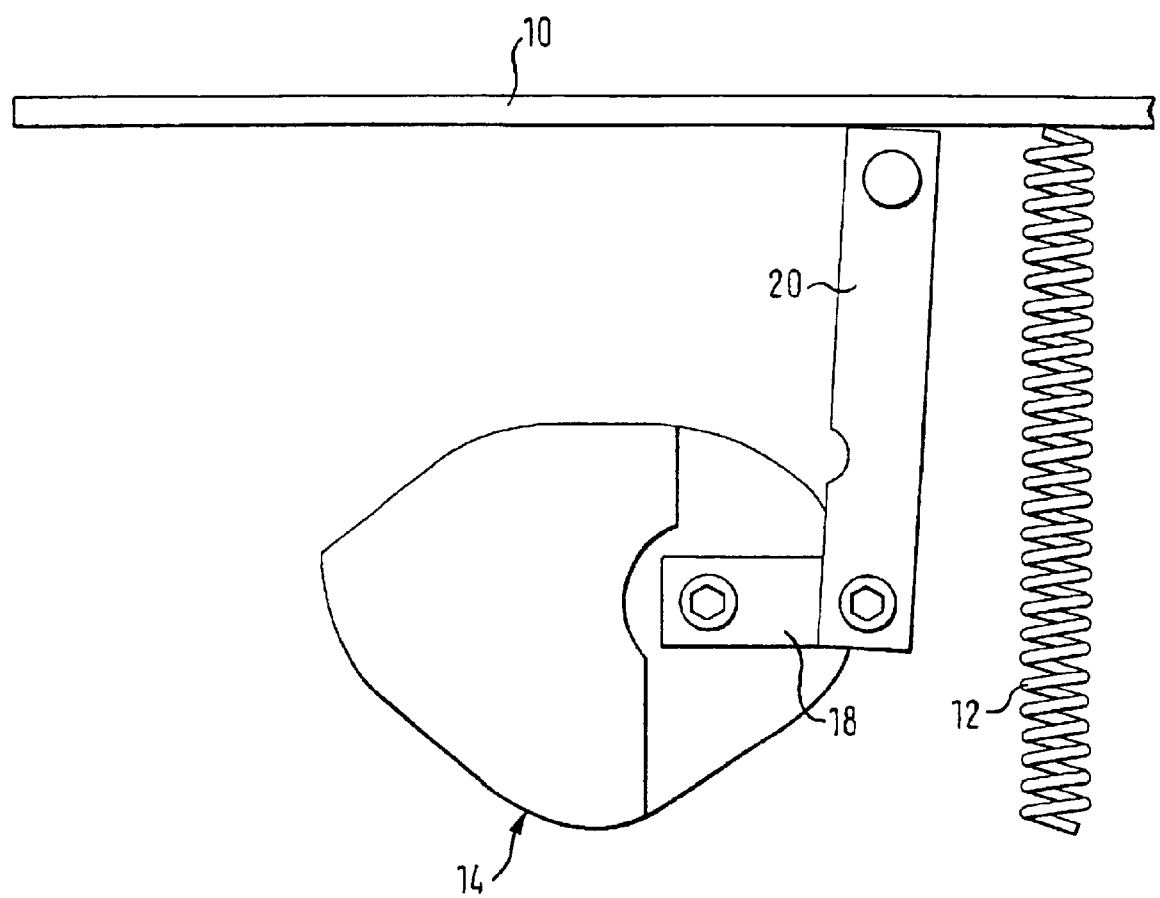
FIG. 2 shows the hood of FIG. 1 in a lifted position.

In the event of a collision, e.g. with a pedestrian, the hood 10 is brought into a lifted position (FIG. 2). The energy for that process is taken mainly from an electrical drive motor 44 that is part of the drive unit 14 and will be described later on in greater detail. The energy storing device 12 supports only the initial movement of the hood 10. In this lifted position, the first arm 18 of the crank mechanism is rotated by 90° (in anti-clockwise direction here) with respect to its position when closed. The hood 10 is now lifted with respect to the closed position. Lifting the hood 10 is performed so rapidly that e.g. a pedestrian, which is struck by the passenger car, will hit the hood 10 which is already lifted. The drive unit and the hood 10 are designed such that the hood 10 can be deformed in order to take up the energy of the pedestrian. If no collision occurs or after the impact, the hood 10 can again be transferred into the closed position by the drive unit 14.

Figure 3:
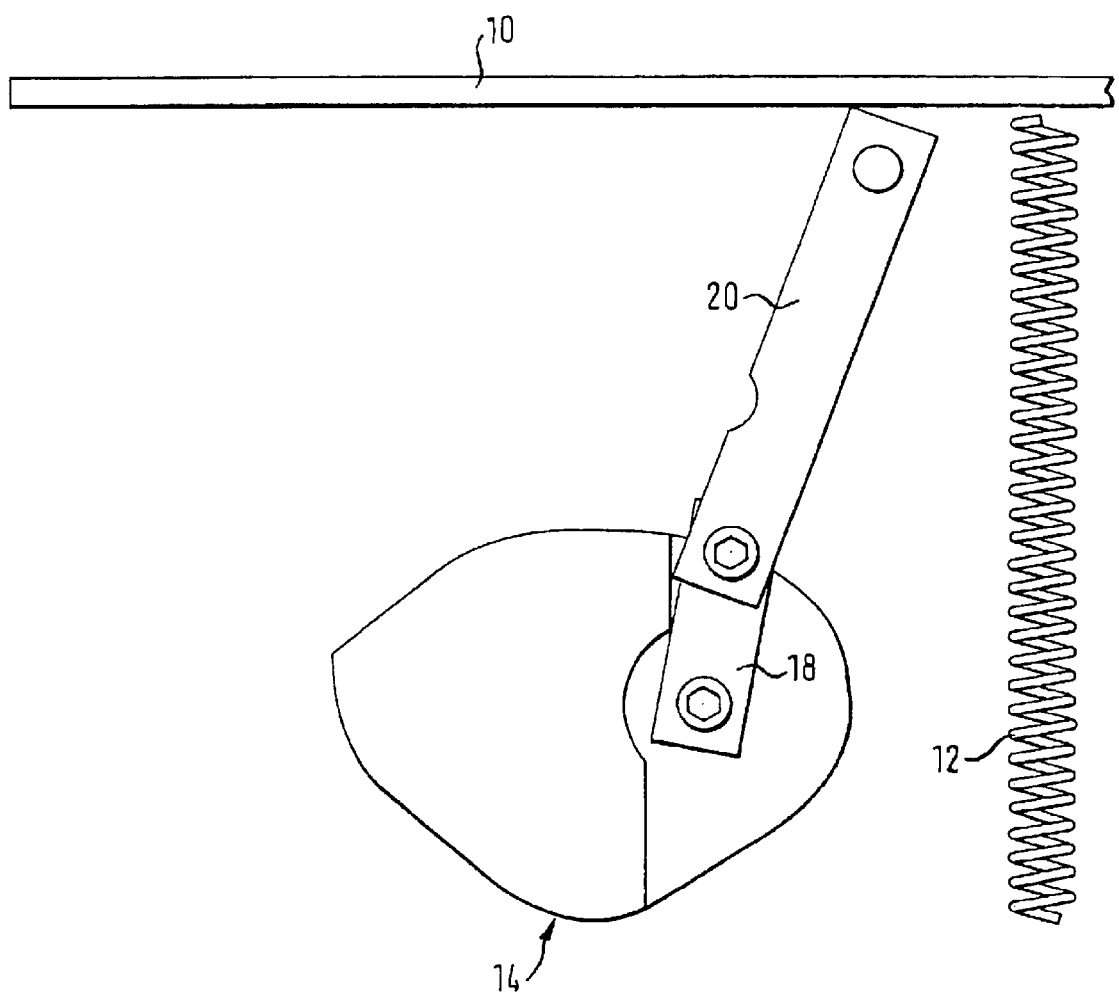
FIG. 3 shows the hood of FIG. 1 in a maintenance or end position.
Figure 4:
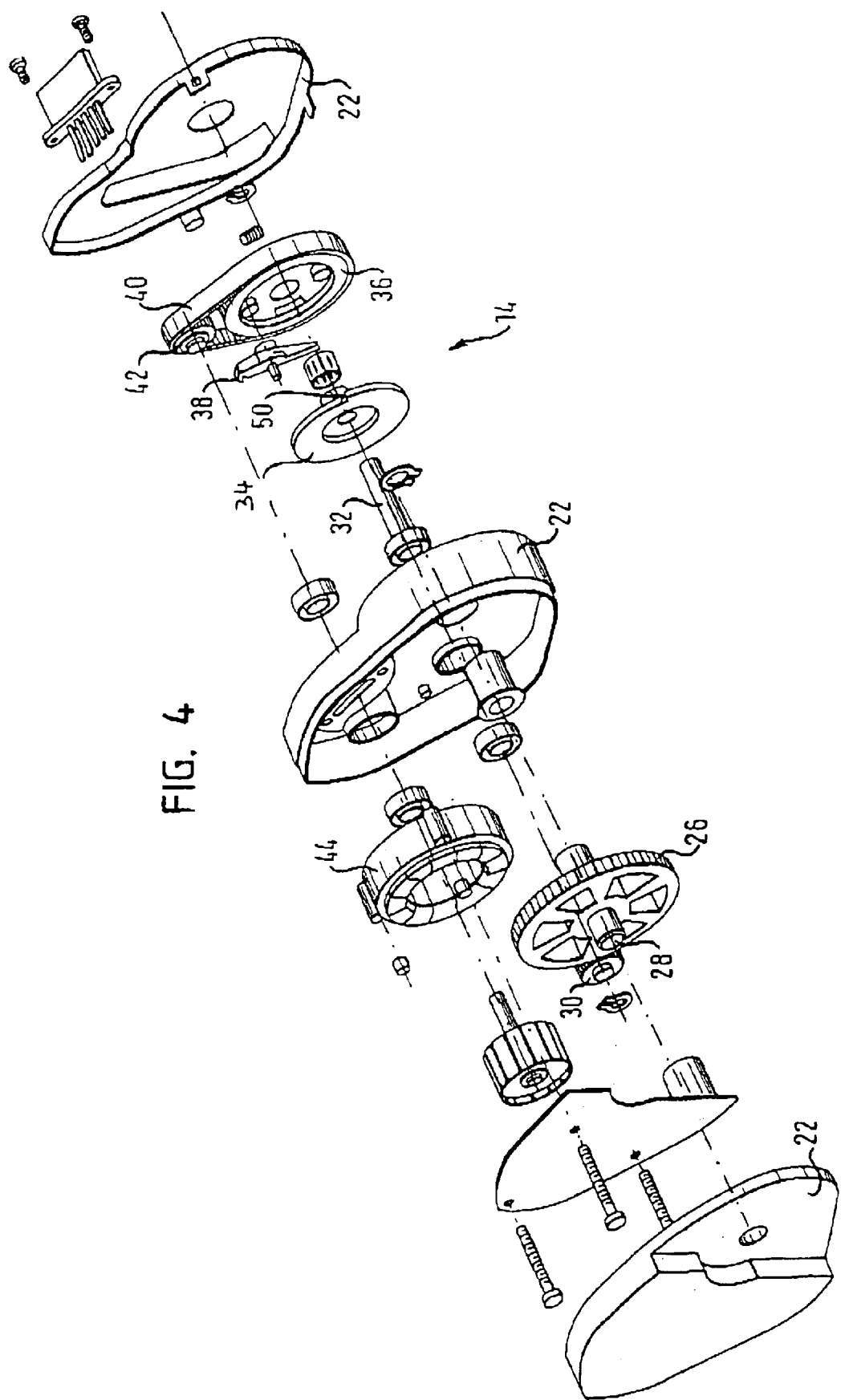
FIG. 4 is an exploded partial view of a drive unit according to the invention.
Figure 5:
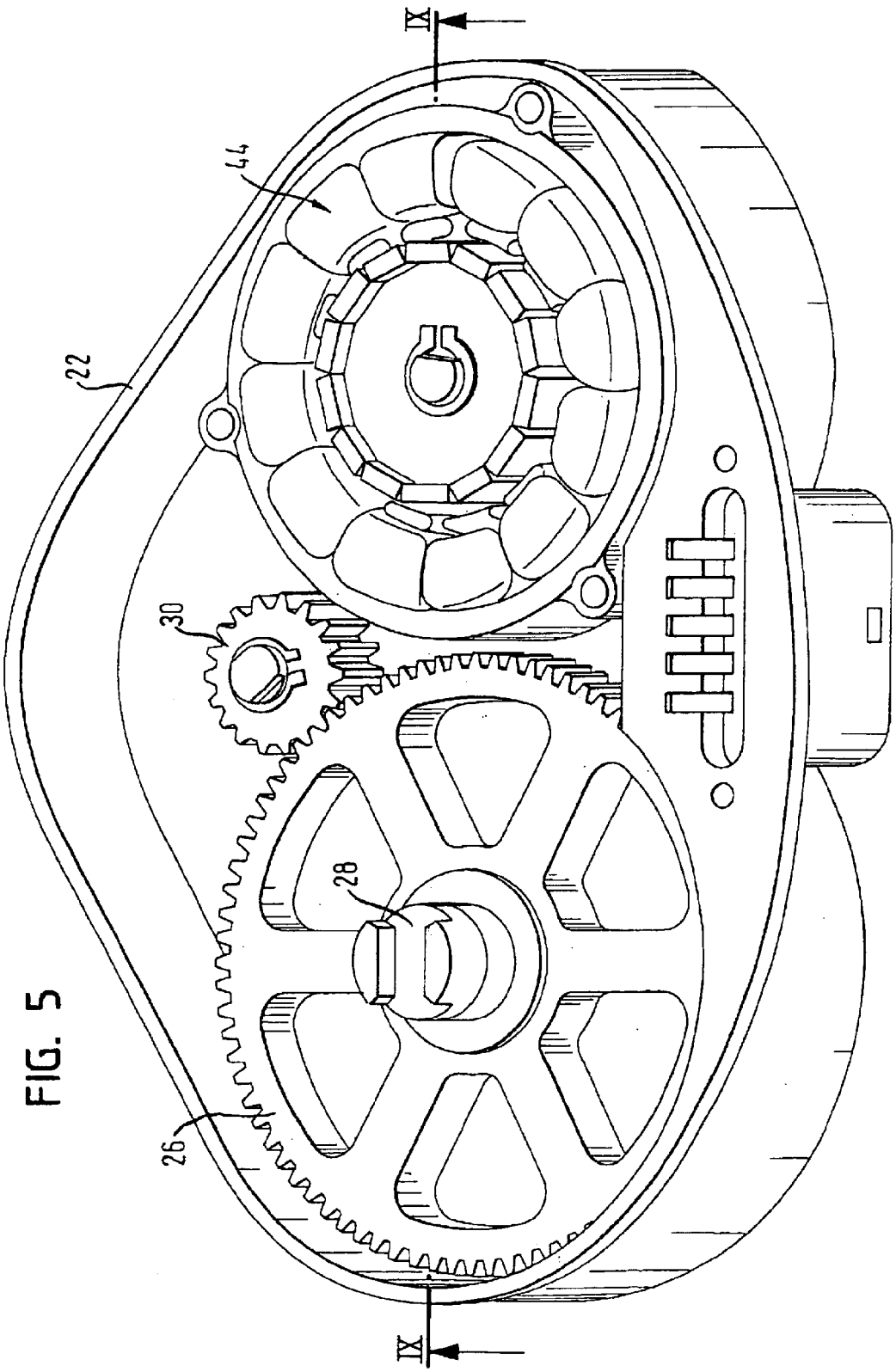
FIG. 5 is a schematic, perspective partial view of a drive unit used with the invention, as seen from a first side with an opened housing.
Figure 6:
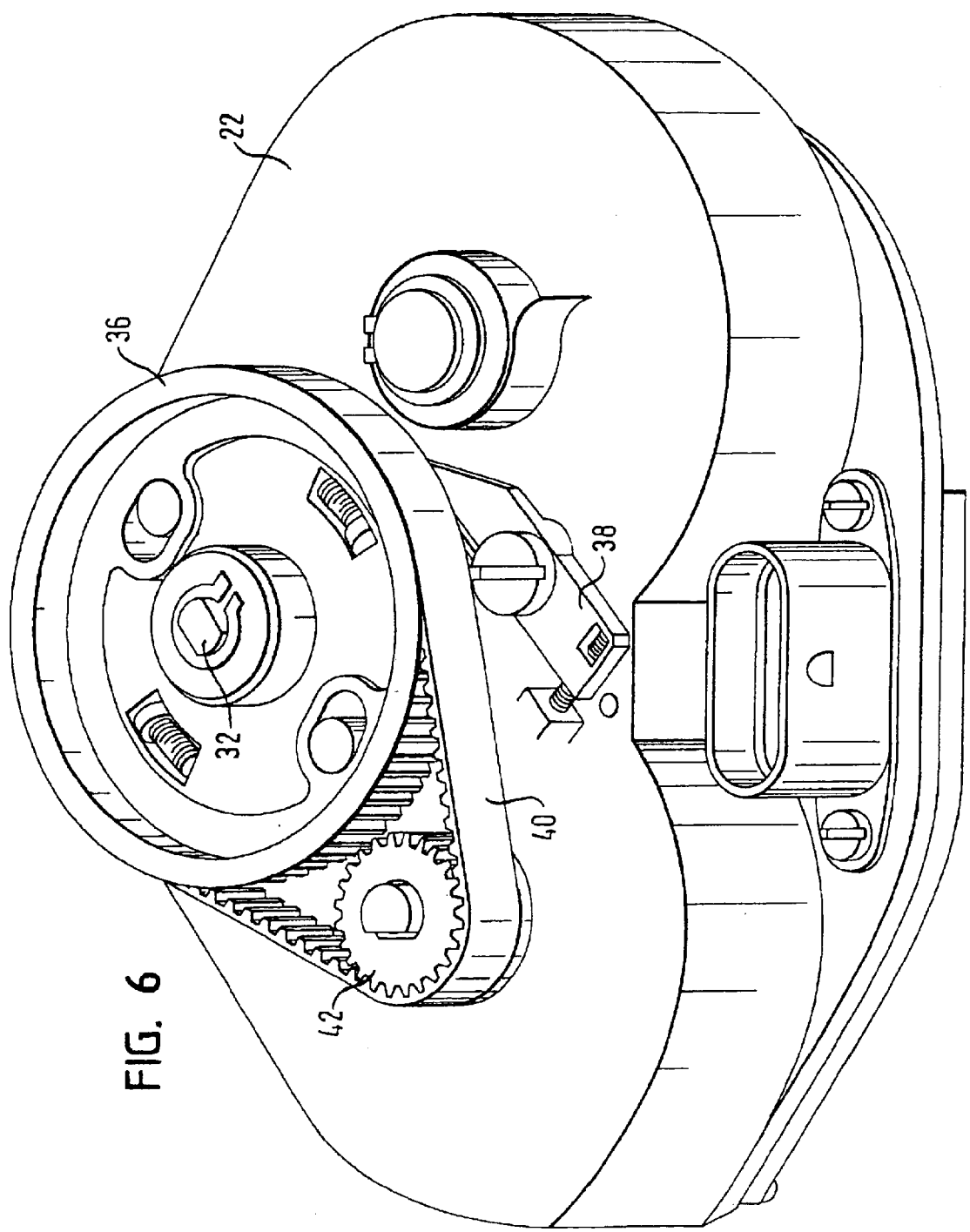
FIG. 6 shows the drive unit of FIG. 5 from an opposite side with an opened housing.
Figure 8:
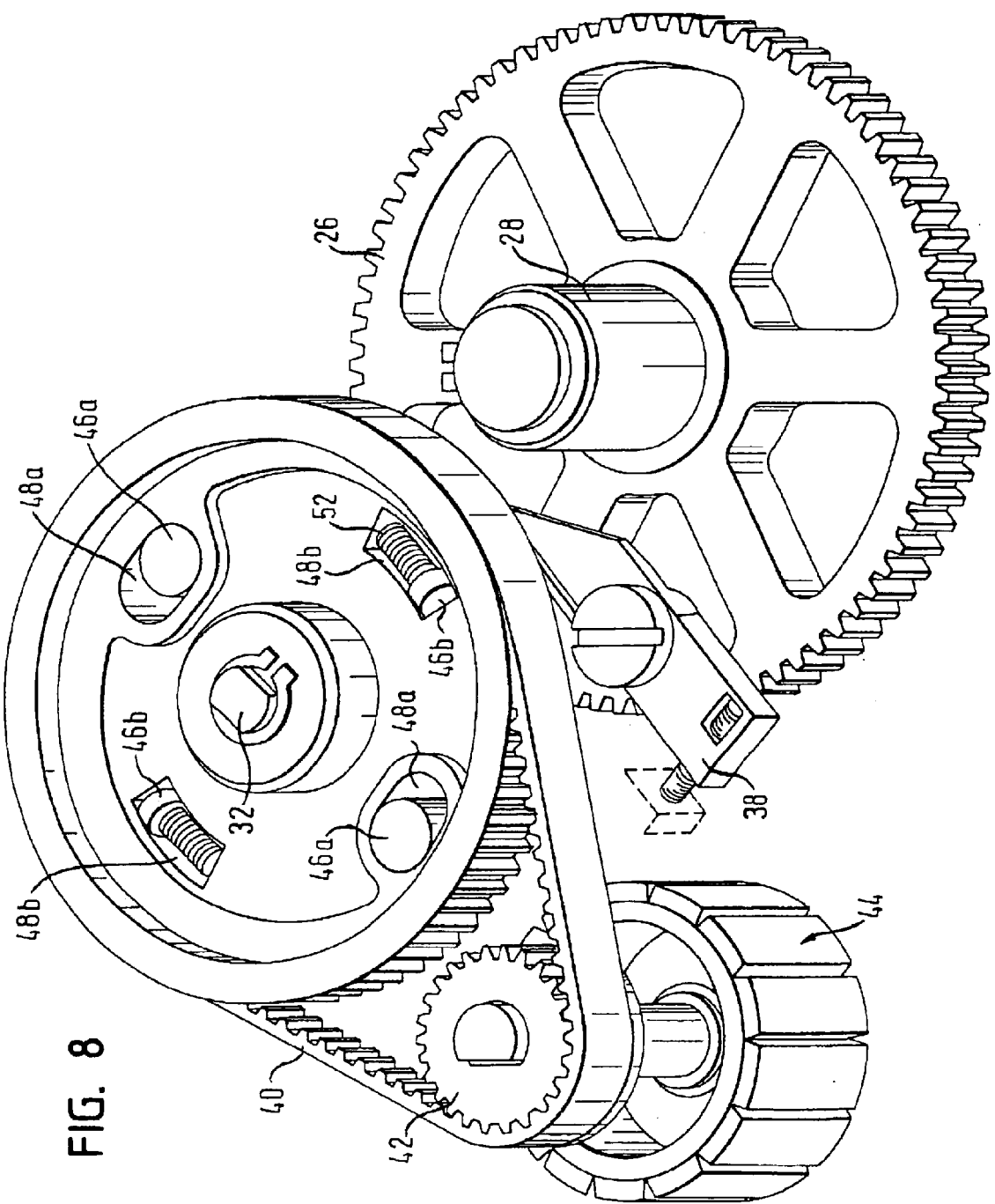
FIG. 8 is a schematic, perspective partial view of the drive unit of FIG. 5 without the housing.
Figure 9:
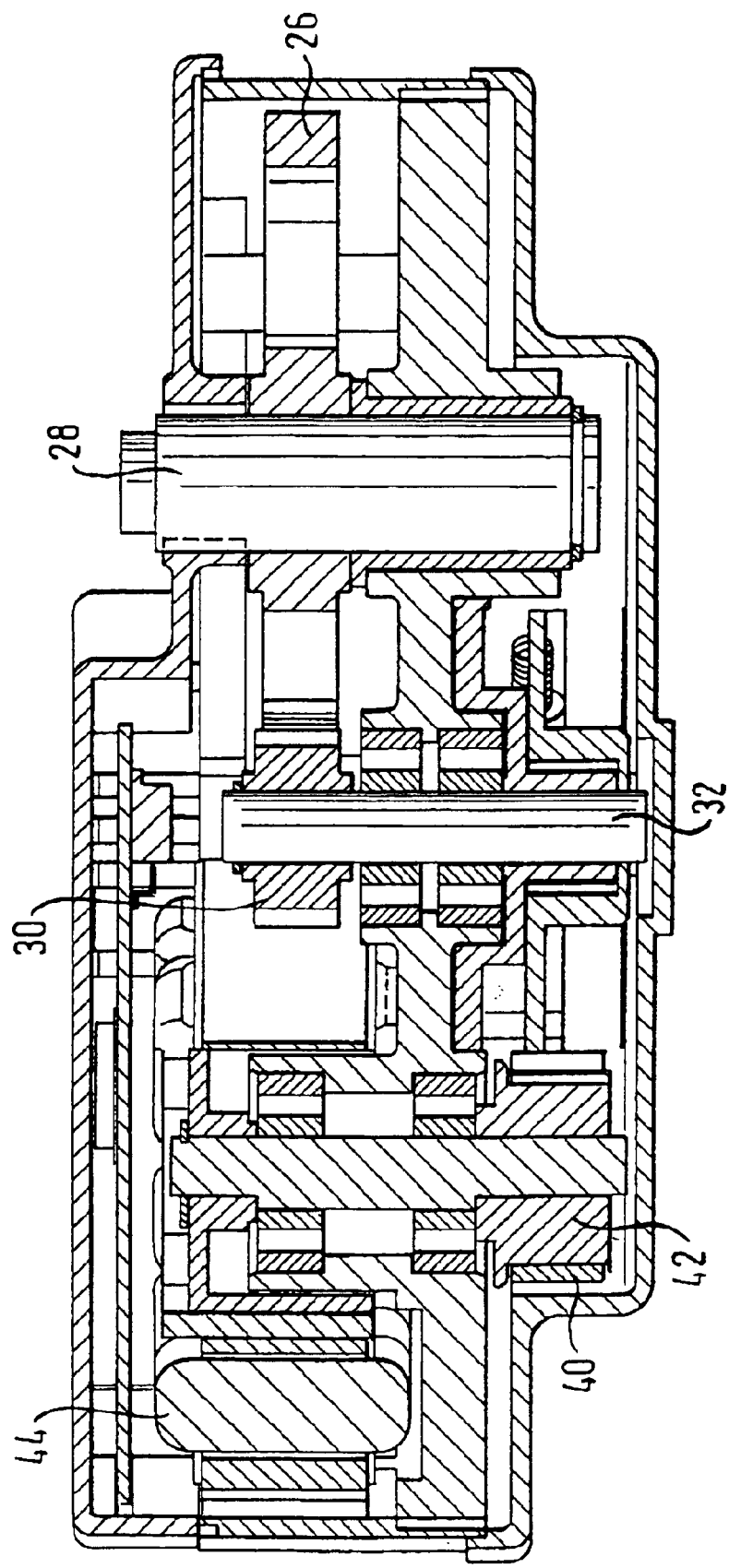
FIG. 9 shows a section along line IX—IX of FIG. 5.

The drive unit 14 may also be used for lifting the hood 10 into a maintenance position that goes beyond the lifted position and is shown in FIG. 3. In one embodiment of the invention, this position can also be the end position for the lifting movement, i.e. the lifted position. The crank mechanism is moved so far until the end of the first arm 18 that is connected with the second arm 20 is rotated by approximately 180° with respect to the closed position, and the crank mechanism arrives at a dead center position.

The drive unit 14 has a housing 22 with an outer side to which the crank mechanism 16 is mounted. Provided on the housing 22 are stops 24 for the first arm 18.

Figure 11:
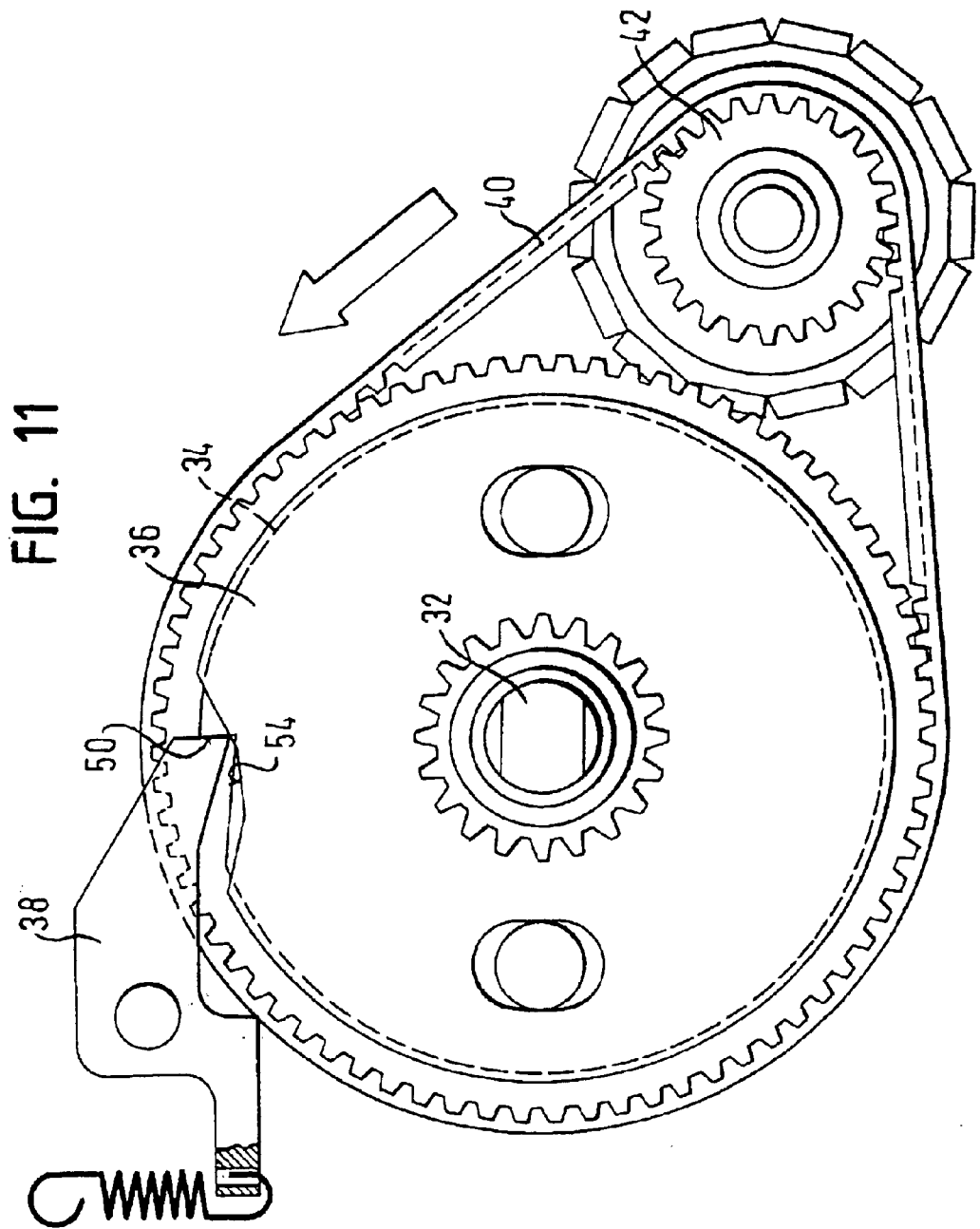

Arranged in the interior of the housing 22 is a first toothed wheel 26 which is non-rotatably connected with the crank mechanism 16 by means of a shaft 28. This toothed wheel 26 meshes with a second toothed wheel 30 which is connected with a first locking disc 34 by means of a shaft 32. A second locking disc 36 is rotatably provided on the shaft 32. In the closed position of the hood 10, a locking pawl 38 rests against the first locking disc 34 (see stop 50 in FIG. 11), so that the shaft 32 is prevented from rotating in one direction. The locking pawl 38 is pivotally mounted on the housing and is biased in a direction towards the first locking disc 34 by means of a restoring spring. By means of a toothed belt 40, which is applied to the locking disc 36, and a third toothed wheel 42, the second locking disc 36 realized as a toothed wheel can be driven by the electric drive motor 44. The drive motor 44 is a known high-speed, brushless, low inertia DC servo motor. The rotor of the motor 44 is bell-shaped so as to reduce its inertia further. The motor 44 is able to provide the energy to lift a 20 kg engine hood in about 60 ms over a lifting distance of about 60 mm.

The toothed wheels 42, 36, 30 and 26 are components of a two-stage reduction gear.

The locking pawl 38 together with the two locking discs 34, 36 forms a traveling stop which blocks in the closed position a rotation of the first toothed wheel 26 and, hence, of the crank mechanism 16. Since the hood 10 is connected with the second arm 20, a lifting of the hood 10 e.g. by the energy storing device is prevented in this position. The traveling stop as well as the mode of releasing it (see also FIGS. 7 to 13) will be described in detail in the following.

The first locking disc 34 has four protrusions 46a, 46b which project into corresponding openings 48a, 48b in the second locking disc 36. Helical springs 52 are arranged between the protrusions 46b and the edge of the openings 48b. The protrusions 46a, 46b are inserted in the openings 48a, 48b so as to have a specific play, so that the second locking disc 36 can be rotated with respect to the first locking disc 34 by a specific angle and against the restoring force of the springs 52. It is only the first locking disc 34 which is non-rotatably connected with the shaft 32.

Figure 10:
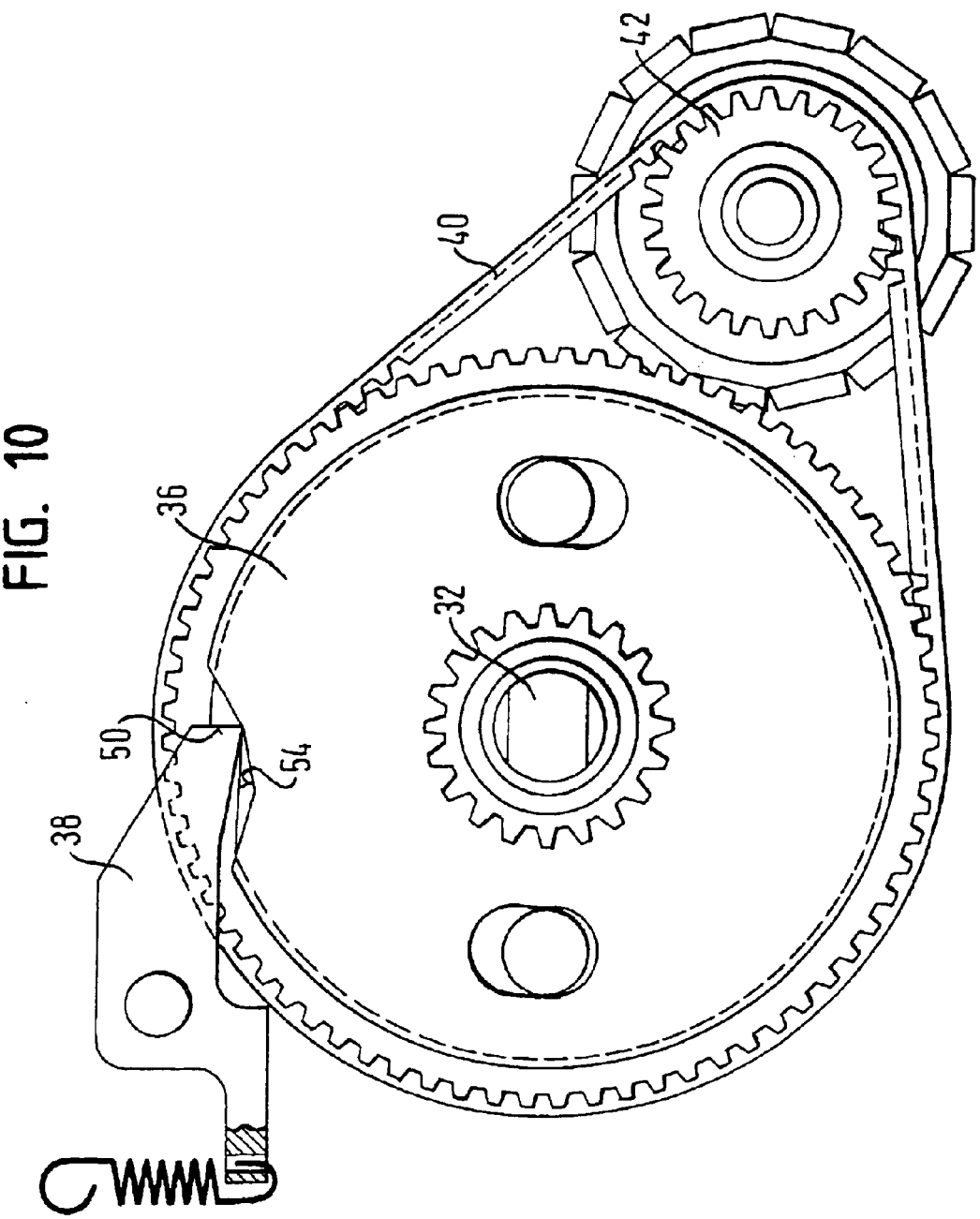
FIGS. 10 to 13 are schematic illustrations of the drive unit at various moments during releasing the traveling stop without showing the housing.

On its outer edge, the first locking disc 34 has a stop 50 against which the locking pawl 38 rests in the closed position (FIG. 10). The second locking disc 36 has a slope 54 in the region of the contact surface of locking pawl 38.

Figure 12:
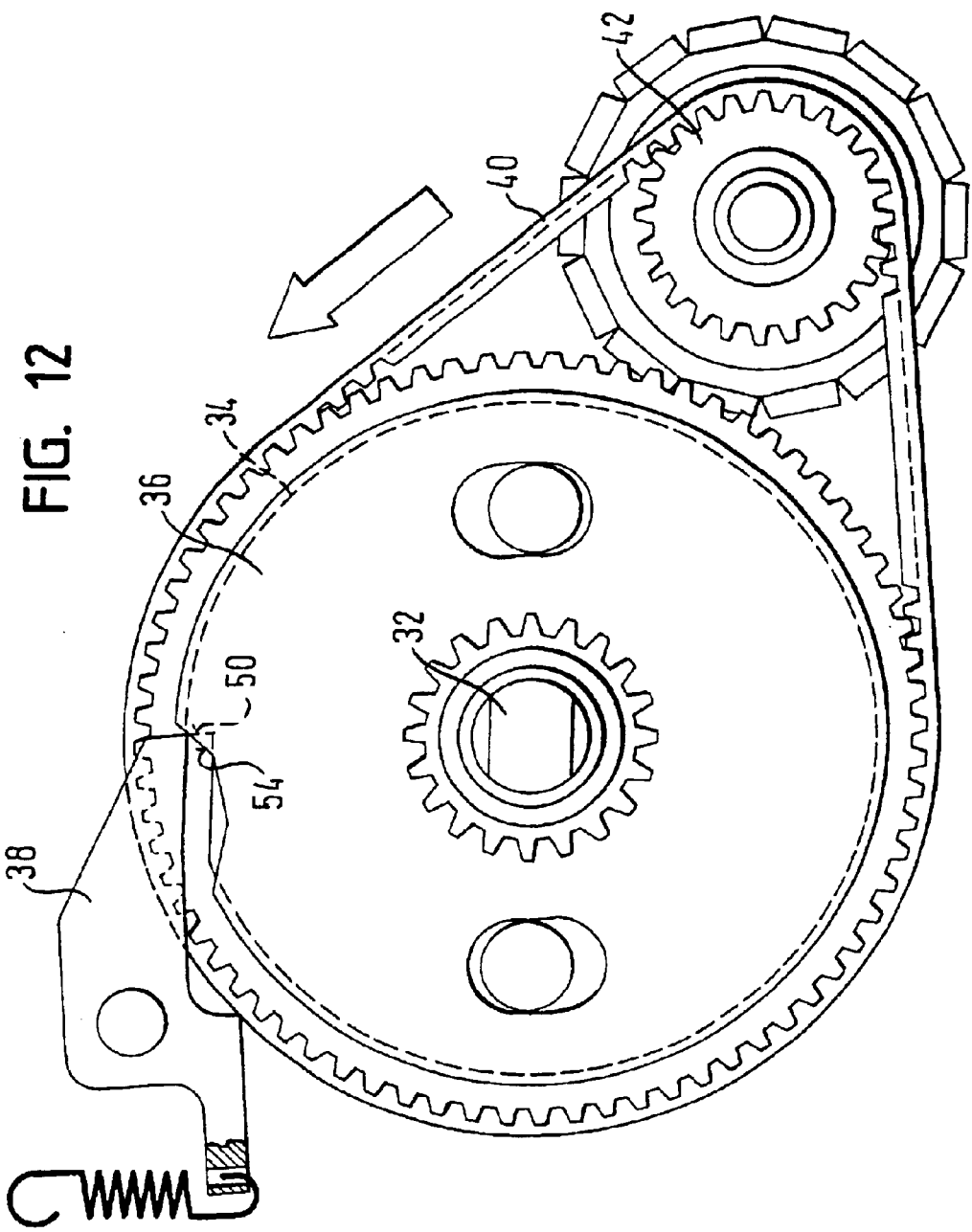
Figure 13:
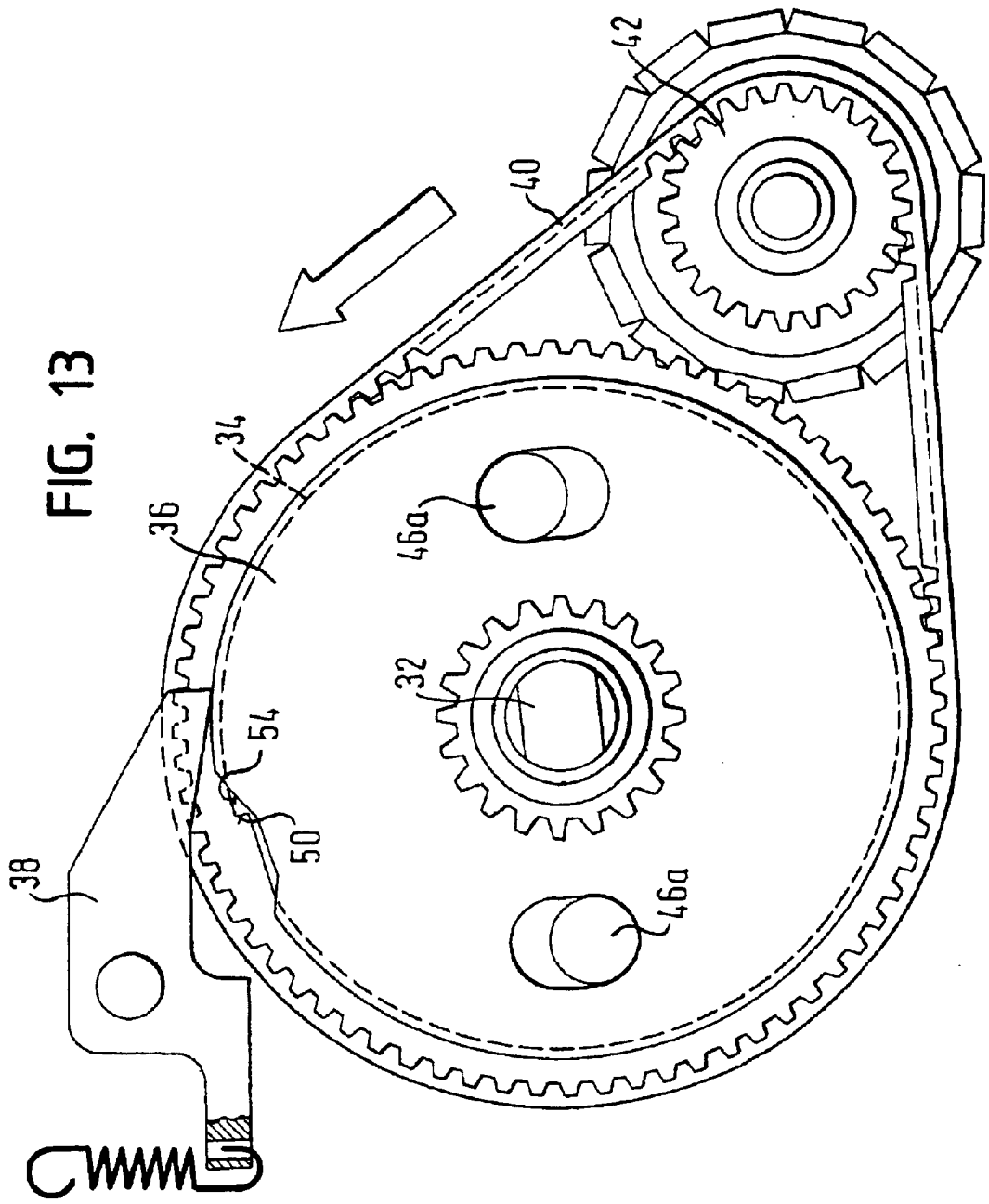

If the motor 44, which has a very quick run-up, is in operation, then force is transferred through the toothed belt 40 to the second locking disc 36, and the second locking disc 36 is slightly rotated (see arrow in FIGS. 11 and 12) with respect to the first locking disc 34, because the first locking disc 34 is retained by the locking pawl 38. Due to the rotation of the second locking disc 36, the slope 54 moves with respect to the locking pawl 38, so that the locking pawl 38 is lifted off from the stop 50 of the first locking disc 34 (FIG. 12). The traveling stop is released now, and the protrusions 46b rest against circumferential wall portions of the openings 48b, so that the locking disc 6 drives the locking disc 34 (FIG. 12). No external mean for releasing the locking pawl 38 is provided.

Figure 14:
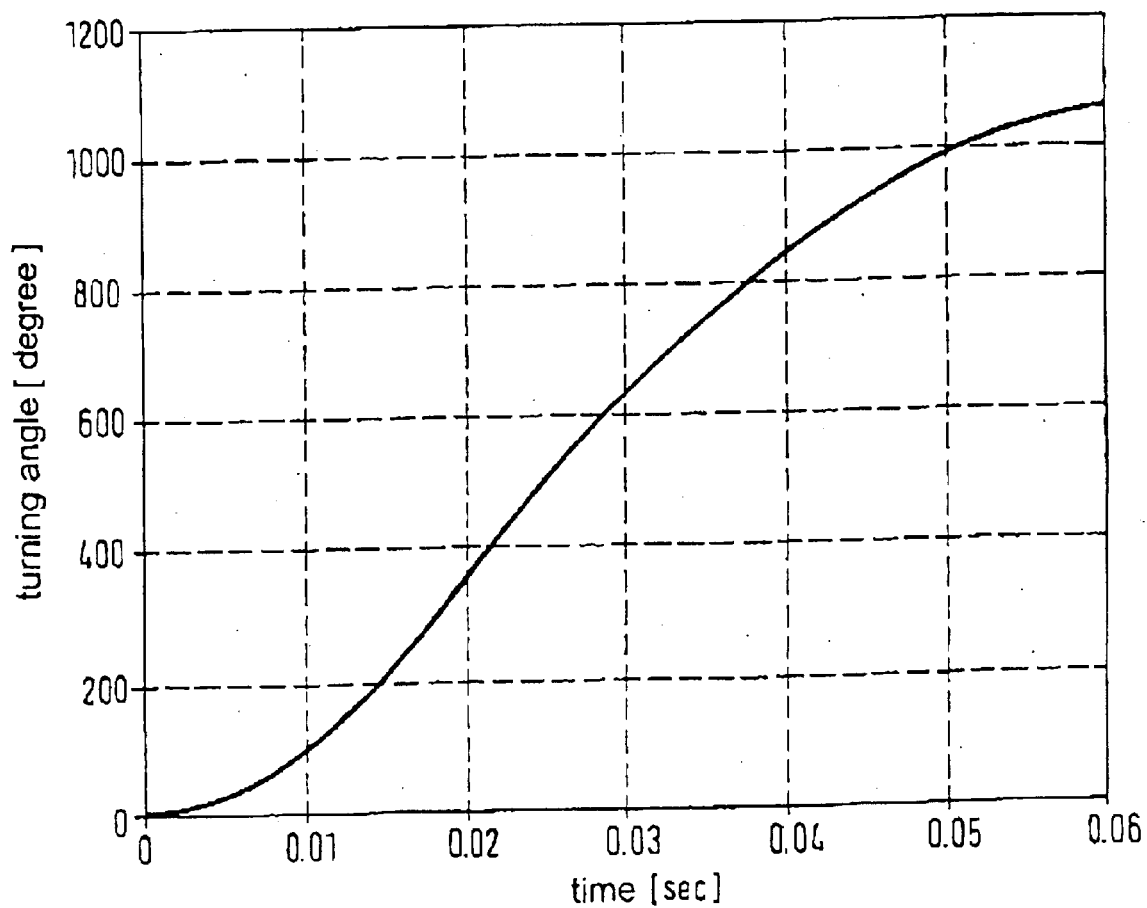
FIG. 14 shows the movement of the hood versus time in turning angle of the drive motor.
Figure 15:
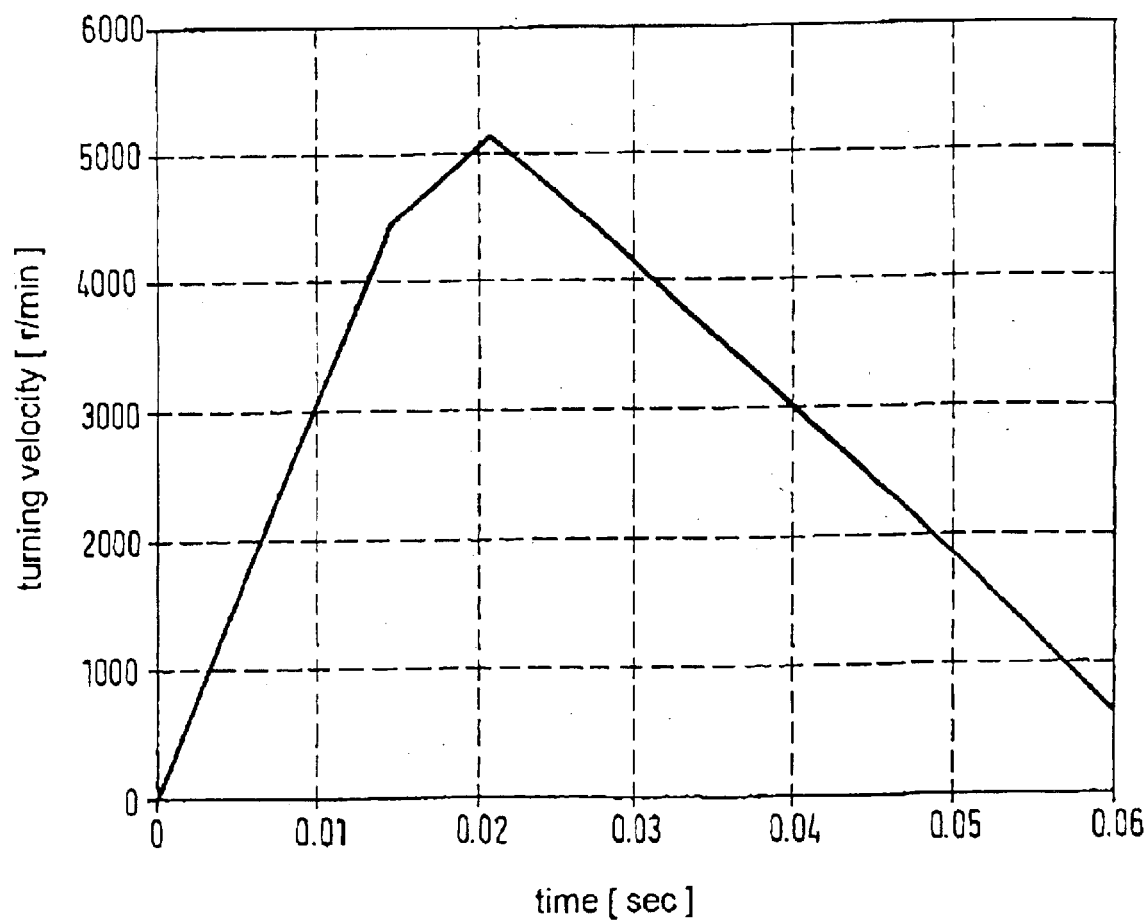
FIG. 15 shows the motor turning speed versus time during the opening of the hood.

A programmable electronic actuation unit 60 (FIG. 1) coupled to a crash sensor (not shown) actuates the drive motor 44 on signal of the sensor. The motor is then accelerated very rapidly to initiate the movement of the hood into its lifted position (FIG. 15). The inertia of the motor 44 and drive 14 are to be neglected in comparison with the inertia of the hood 10. After the drive motor 44 has accelerated the hood 10, the actuation unit 60 controls the motor 44 in a manner that the hood is decelerated over the final part of the lifting distance, so that the hood reaches the lifted position with a relatively slow speed and no abrupt stop of the movement occurs. Oscillations of the hood can be avoided. The travelling curve of the hood is shown in FIG. 14. During the last part of the lifting distance the motor 44 effectively acts as a brake as the actuation unit 60 is appropriately programmed to amend the controlling of the motor after the initial acceleration of the hood. In the lifted position, the hood is preferably locked against movement back into the closed position by the crank mechanism 16, which e.g. in a known way is provided with a snap-in locking device, which can be released by further movement of the crank mechanism (not shown), or which is in a dead center position shown in FIG. 3.

For transferring the hood 10 from the lifted position back into the closed position, the motor 44 is operated in the reverse direction of rotation. The motor power is transferred to the hood 10 through the gear and the crank mechanism 16; with the result that the hood is moved back into its closed position against the force of the energy storing device 12. In so doing, energy is returned to the energy storing device 12. If the hood 10 is in the closed position again, the motor is switched off and the locking pawl 38 again comes to rest against the stop 50. As long as the motor 44 does not provide a rotation of the second locking disc 36, the locking pawl 38 continues to rest against stop 50, and the hood 10 remains in its closed position.

In order to lift the hood 10 beyond the lifted position into the maintenance position, the motor 44 is operated in the same direction as for releasing the traveling stop, if the hood 10 is in the lifted position. The crank mechanism 16 can be extended so far until the first arm 18 rests against its housing stop 24. When this position is the end position of the hood lifting movement, the motor 44 moves the crank mechanism 16 until the dead center position is reached.

What is claimed is:

1. Apparatus comprising: a motor vehicle hood which is movable between a closed position and a lifted position, and a drive for moving said hood between the closed position and the lifted position, said drive comprising a drive unit having an electric drive motor and being effective between a vehicle structure and said hood, said drive motor abruptly moving said hood into said lifted position in the case of an accident.

2. The apparatus according to claim 1, wherein said drive unit comprises a traveling stop for limiting the movement of said drive.

3. The apparatus according to claim 2, wherein said traveling stop is located in a force flow path between said drive motor and said hood.

4. The apparatus according to claim 2, wherein a gear is provided and wherein said traveling stop is released by a rotation of said drive motor.

5. The apparatus according to claim 1, wherein said traveling stop comprises a locking pawl.

6. The apparatus according to claim 1, wherein said drive motor is coupled with a reduction gear and forms said drive unit with it.

7. The apparatus according to claim 1, wherein said drive motor is a brushless DC motor having an internal rotor.

8. Apparatus comprising: a motor vehicle hood which is movable between a closed position and a lifted position and a drive for moving said hood between said closed position and said lifted position, said drive comprising a drive unit having an electric drive motor and being effective between a vehicle structure and said hood, said drive motor abruptly moving said hood into said lifted position in the case of an accident, said drive unit comprising a traveling stop for limiting the movement of said drive, wherein a gear is provided and wherein said traveling stop is released by a rotation of said drive in motor, and wherein at the commencement of its driving motion, said drive motor at first releases said traveling stop and then moves said hood.

9. Apparatus comprising: a motor vehicle hood which is movable between a closed position and a lifted position and a drive for moving said hood between said closed position and said lifted position, said drive comprising a drive unit having an electric drive motor and being effective between a vehicle structure and said hood, said drive motor abruptly moving said hood into said lifted position in the case of an accident, wherein said drive unit comprises a traveling stop for limiting the movement of said drive, said traveling stop comprising a locking pawl, wherein said traveling stop comprises a first and a second locking disc, which are coupled with each other and which can be rotated with respect to each other by a predetermined angle against a restoring force.

10. The apparatus according to claim 9, wherein said first locking disc has a stop against which said locking pawl rests when said traveling stop is active.

11. The apparatus according to claim 10, wherein said second locking disc has a slope which cooperates with said locking pawl in such a way that said locking pawl is released from said stop on said first locking disc when said locking discs are rotated with respect to each other.

12. The apparatus according to claim 11, wherein said second locking disc can be rotated by means of said drive motor.

13. Apparatus comprising: a motor vehicle hood which is movable between a closed position and a lifted position and a drive for moving said hood between said closed position and said lifted position, said drive comprising a drive unit having an electric drive motor and being effective between a vehicle structure and said hood, said drive motor abruptly moving said hood into said lifted position in the case of an accident, wherein said drive comprises an energy storing device which in said closed position biases said hood into said lifting direction and which is a component that is separate from said drive unit.

14. The apparatus according to claim 13 wherein said drive motor is capable of moving said hood from said lifted position into said closed position and wherein said drive motor counteracts said energy storing device during such movement.

15. Apparatus comprising: a motor vehicle hood which is movable between a closed position and a lifted position and a drive for moving said hood between said closed position and said lifted position, said drive comprising a drive unit having an electric drive motor and being effective between a vehicle structure and said hood, said drive motor abruptly moving said hood in said lifted position in the case of an accident, wherein said drive motor is coupled with a reduction gear and forms said drive unit with it, wherein a crank mechanism is provided, an output side of which is coupled to said hood and an input side of which is coupled to said drive motor via said reduction gear.

16. Apparatus comprising: a motor vehicle hood which is movable between a closed position and a lifted position and a drive for moving said hood between said closed position and said lifted position, said drive comprising a drive unit having an electric drive motor and being effective between a vehicle structure and said hood, said drive motor abruptly moving said hood into said lifted position in the case of an accident, said hood can be lifted by said drive unit into a maintenance position in which it is lifted further than in said lifted position.

17. Apparatus comprising: a motor vehicle hood which is movable between a closed position and a lifted position and a drive for moving said hood between said closed position and said lifted position, said drive comprising a drive unit having an electric drive motor and being effective between a vehicle structure and said hood, said drive motor abruptly moving said hood into said lifted position in the case of an accident, wherein said drive motor is coupled with a reduction gear and forms said drive unit with it, wherein said reduction gear is configured so as to have several stages and a traveling stop engages between two stages of said reduction gear.

18. Apparatus comprising: a motor vehicle hood which is movable between a closed position and a lifted position and a drive for moving said hood between said closed position and said lifted position, said drive comprising a drive unit having an electric drive motor and being effective between a vehicle structure and said hood, said drive motor abruptly moving said hood into said lifted position in the case of an accident, and said drive being programmed to drive said drive motor in such a way that the latter reduces a speed of said motor vehicle hood prior to achieving said lifted position.

* * * * *

UNITED STATES PATENT AND TRADEMARK OFFICE
CERTIFICATE OF CORRECTION

PATENT NO. : 6,860,356 B2  
DATED : March 1, 2005  
INVENTOR(S) : Cornelius Peter It is certified that error appears in the above-identified patent and that said Letters Patent is hereby corrected as shown below:

Column 4,
Line 65, after "drive" delete "in".

Signed and Sealed this

Fifth Day of July, 2005

JON W. DUDAS
*Director of the United States Patent and Trademark Office*